United States Patent
Tucovic et al.

(10) Patent No.: US 10,865,847 B2
(45) Date of Patent: Dec. 15, 2020

(54) DAMPING VALVE COMPRISING A DIRECTION-DEPENDENT PILOT OPENING CROSS-SECTION FOR A VIBRATION DAMPER

(71) Applicant: ZF FRIEDRICHSHAFEN AG, Friedrichshafen (DE)

(72) Inventors: Harun Tucovic, Schweinfurt (DE); Oswald Lichtlein, Bergtheim (DE); Eberhard Simon, Gochsheim (DE); Helmut Baalmann, Bergrheinfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 64 days.

(21) Appl. No.: 16/319,144

(22) PCT Filed: Jun. 19, 2017

(86) PCT No.: PCT/EP2017/064894
§ 371 (c)(1),
(2) Date: Jan. 18, 2019

(87) PCT Pub. No.: WO2018/015084
PCT Pub. Date: Jan. 25, 2018

(65) Prior Publication Data
US 2019/0264770 A1    Aug. 29, 2019

(30) Foreign Application Priority Data
Jul. 21, 2016    (DE) .................. 10 2016 213 328

(51) Int. Cl.
*F16F 9/348*    (2006.01)
*F16K 3/02*    (2006.01)
*F16K 3/10*    (2006.01)

(52) U.S. Cl.
CPC .......... *F16F 9/3484* (2013.01); *F16F 9/3488* (2013.01); *F16K 3/029* (2013.01); *F16K 3/10* (2013.01); *F16F 2226/048* (2013.01)

(58) Field of Classification Search
None
See application file for complete search history.

(56) References Cited

U.S. PATENT DOCUMENTS

| 2007/0170028 A1* | 7/2007 | Yang | F16F 9/3484 188/322.15 |
| 2013/0192457 A1* | 8/2013 | Ashiba | F16F 9/3484 92/169.1 |

(Continued)

FOREIGN PATENT DOCUMENTS

| DE | 19712895 | 10/1998 |
| DE | 10351357 | 2/2005 |

(Continued)

OTHER PUBLICATIONS

International Search Report based on PCT/EP2017/064894 dated Sep. 18, 2017.
German Search Report dated Jul. 21, 2016.

*Primary Examiner* — John Fox
(74) *Attorney, Agent, or Firm* — Cozen O'Connor

(57) ABSTRACT

A damping valve includes a valve body has at least one through-flow channel for each flow direction of a damping medium through the valve body. Each through-flow channel connects an inlet to an outlet. a valve disk covers the through-flow channels at the outlet opening the valve disk has a first volume flow of the damping medium through the valve body, at least one pre-orifice in the valve disk and at least one pre-orifice throttle arrangement is arranged at least indirectly adjoining the valve disk and adapted to at least partially cover or open the pre-orifice depending on the flow direction of a damping medium. The pre-orifice throttle (Continued)

arrangement includes multiple structural component parts arranged coaxial to one another, at least two of the structural component parts are inseparably connected to one another.

11 Claims, 2 Drawing Sheets

(56) References Cited

U.S. PATENT DOCUMENTS

| | | | | |
|---|---|---|---|---|
| 2015/0034434 A1* | 2/2015 | Izeki | ............... | F16F 9/512 188/280 |
| 2017/0241502 A1* | 8/2017 | Rummel | ............... | B60G 13/08 |

FOREIGN PATENT DOCUMENTS

| | | |
|---|---|---|
| DE | 102006004753 | 4/2007 |
| DE | 102007007722 | 6/2008 |
| EP | 2362114 | 8/2011 |
| JP | 2011064285 | 3/2011 |
| JP | 2013190043 | 9/2013 |

\* cited by examiner

DAMPING VALVE COMPRISING A DIRECTION-DEPENDENT PILOT OPENING CROSS-SECTION FOR A VIBRATION DAMPER

CROSS-REFERENCE TO RELATED APPLICATIONS

This is a U.S. national stage of application No. PCT/EP2017/064894 filed Jun. 19, 2017.

This application claims the priority of German Application No. 102016213328.4 filed Jul. 21, 2016, the entire content of which is hereby incorporated herein by reference.

BACKGROUND OF THE INVENTION

1. Field of the Invention

The present invention is directed to a damping valve with direction-dependent pre-orifice cross section for a vibration damper, in particular for a motor vehicle vibration damper.

2. Description of the Related Art

Generic vibration dampers are well known from the prior art. They comprise at least one working cylinder filled with a damping medium and at least one piston arranged inside the working cylinder and moveable inside the working cylinder in a reciprocating manner along a longitudinal axis of the working cylinder, i.e., axially, by a piston rod fastened to the piston. A generic vibration damper further comprises at least one damping valve constructed as a piston valve, i.e., at the piston, or as a bottom valve. The damping valve generally divides the interior space of the working cylinder into a first working chamber and a second working chamber. The damping valve has a valve body comprising passages that allow a defined flow of damping medium through the valve body in at least one flow direction. The passages are usually covered on at least one side, at the outlet side as it is called, by at least one springing valve disk which selectively throttles a first volume flow of damping medium through the piston.

Beyond this, a damping valve of a generic vibration damper often has at least one further passage, the pre-orifice as it is called, which is usually permanently open and, primarily at lower piston velocities, allows a second volume flow of damping medium through the piston, which second volume flow is generally defined by its cross section and is smaller than the first volume flow mentioned above.

Usually, pre-orifices are realized as recesses in the valve disk or in an additional spring disk adjoining the valve disk or as at least one recess incorporated in the piston body. The throttling effect is adapted through selection of the quantity and/or cross section of these recesses.

The disadvantage in solutions of this kind is the limiting of the throttling effect in one flow direction because there is a flow through the constantly open pre-orifices during the compression of the piston (compression step) as well as during the extension of the piston (rebound step). Accordingly, the constant passage with its one-time adjustment is a compromise and cannot be adjusted corresponding to need.

This disadvantage is avoided by a constant passage separately adjustable in the rebound step and compression step.

Pre-orifices which are open in one through-flow direction and are closed in another through-flow direction are known, for example, from EP 23 62 114 or from DE 197 12 895 A1.

However, solutions, which are carried out in this way, are very costly and require either a specially shaped piston or specially shaped auxiliary component parts. Therefore, the production costs for solutions of this kind are usually comparably high.

SUMMARY OF THE INVENTION

Accordingly, an object of one aspect of the present invention is to provide an alternative damping valve with direction-dependent pre-orifice cross section which is simple and economical to produce.

The generic damping valve comprises a pre-opening throttle arrangement which comprises a plurality of structural component parts arranged coaxial to one another, at least two of the structural component parts being inseparably connected to one another.

Further advantageous embodiments are indicated in the drawings, the associated description.

BRIEF DESCRIPTION OF THE FIGURES

The invention will now be described in more detail referring to the following figures.

The drawings show.

DETAILED DESCRIPTION OF THE FIGURES

Figure 1:
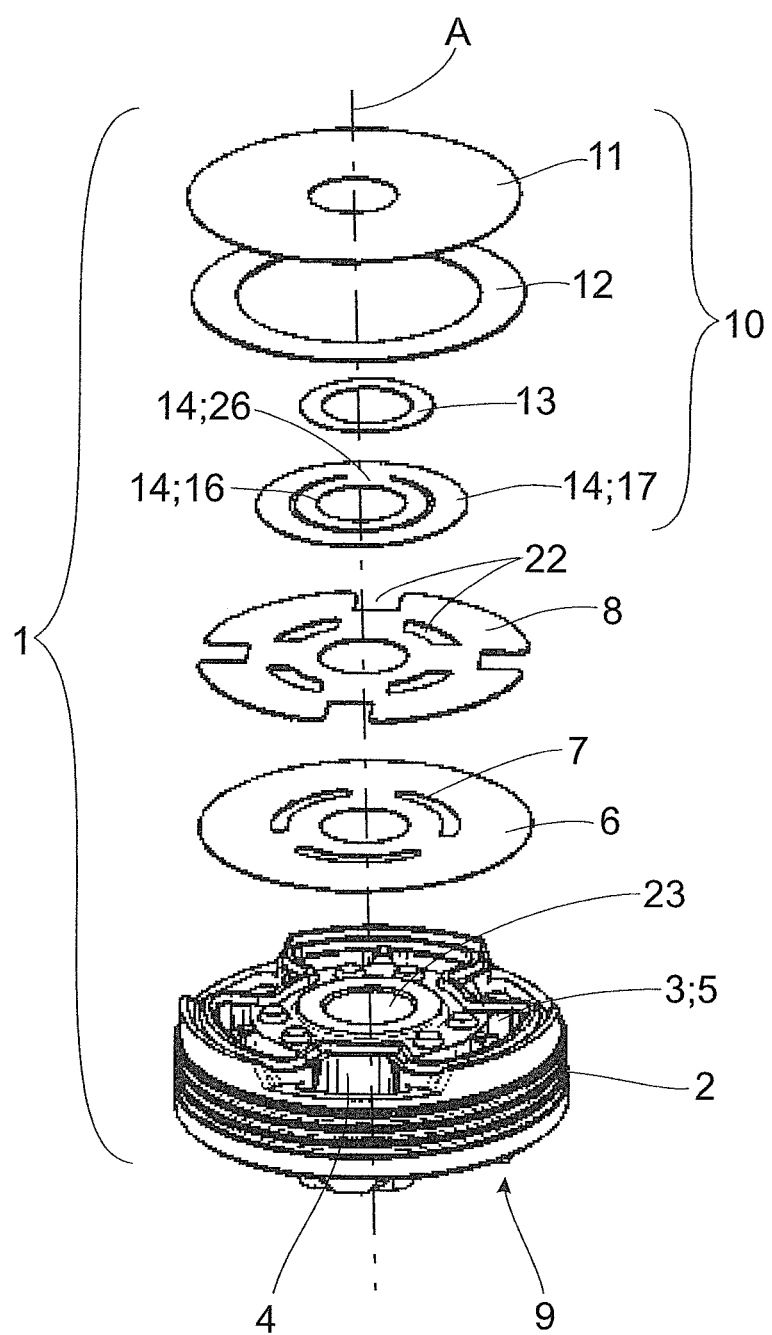
FIG. 1 is an exploded view of an exemplary constructional variant of the damping valve.

FIG. 1 shows an exemplary constructional variant of the damping valve 1 according to one aspect of the invention in an exploded view. This damping valve 1 comprises a valve body 2 with a plurality of through-flow channels 3, 4 for each flow direction of a damping medium through the valve body 2. The through-flow channels 3, 4 connect an inlet opening to an outlet opening for the damping medium in each instance. This is clearly shown at through-flow channel 3 in FIGS. 1 and 2, for example. The inlet opening 9 is connected to the outlet opening 5 through through-flow channel 3.

Further, it is clearly shown in FIG. 1 that through-flow channels 3, 4 are covered by at least one valve disk 6 at the outlet opening 5. The object of the valve disk 6 is to throttle a first volume flow 24 of the damping medium that flows through the valve body 2 while moving through the damping valve 1 inside a damper cylinder, not shown here.

The valve disk comprises a pre-orifice 7, which constitutes a further passage for the second volume flow 25 of the damping medium through the piston. The second volume flow 25 is defined by the cross section or by the dimensioning of the pre-orifice 7 and is smaller than the above-mentioned first volume flow 24. In the constructional variants shown in FIGS. 1 and 2, an additional throttle disk 8 was used. This additional throttle disk 8 directly contacts the valve disk 6 and comprises a plurality of recesses 22 at different radial distances from one another.

Further, the damping valve 1 comprises a pre-orifice throttle arrangement 10, which is arranged at least indirectly adjoining the valve disk 6. The pre-orifice throttle arrangement 10 comprises a plurality of structural component parts 11, 12, 13 and 14, which are substantially disk-shaped and arranged coaxial to one another with respect to axis A. The pre-orifice throttle arrangement 10 is adapted to at least partially cover or open the pre-orifice 7 depending on the flow direction of the damping medium through the damping valve 1. This can be seen particularly clearly from FIG. 2.

As has already been mentioned, FIG. 1 is an exploded view showing individual components of a possible constructional variant according to the invention in a particularly clear manner. For this reason, the individual component parts of the pre-orifice throttle arrangement 10 are also shown separately from one another. According to the invention, at least two of the structural component parts 11, 12, 13, 14 of the pre-orifice throttle arrangement 10 are inseparably connected to one another by connection points 21 as is clearly shown in FIG. 2 and FIG. 3.

Figure 3:
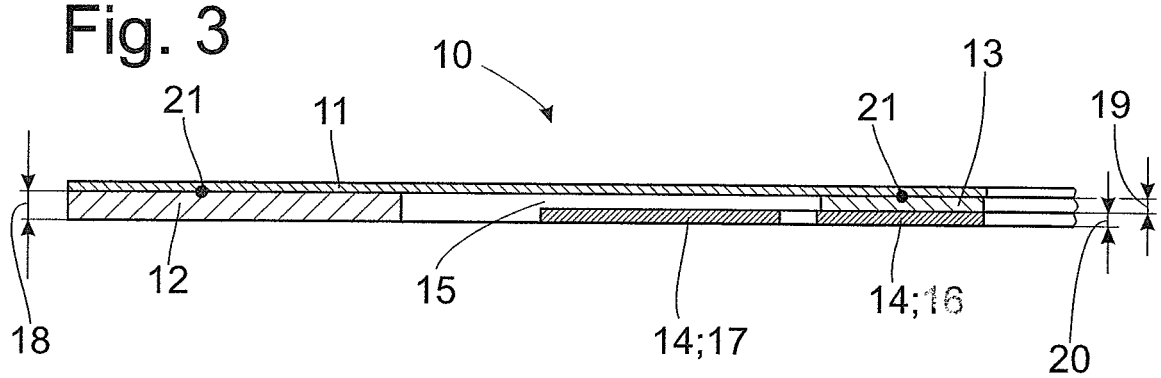
FIG. 3 is a partial sectional view of an exemplary constructional variant of a pre-orifice throttle arrangement.

FIG. 3 shows the pre-orifice throttle arrangement 10 in a partial sectional view. The pre-orifice throttle arrangement 10 comprises a radially outer spacer ring 12, a radially inner spacer ring 13, a first springing cover disk 11 that extends at least partially radially over the radially inner spacer ring 13 and over the radially inner spacer ring 12 and axially directly contacts the two spacer rings 13, 12. The first springing cover disk 11 can be inseparably connected to the radially outer spacer ring 12 or to the radially inner spacer ring 13 or to both spacer rings 12, 13. The connection may be a bonding connection, for example, by gluing or welding. Further, a positive connection of the structural component parts mentioned above is likewise possible.

An annular space 15 is axially limited by the first springing cover disk 11 is arranged between the radially outer spacer ring 12 and the radially inner spacer ring 13.

A second springing cover disk 14 is likewise arranged coaxial to the above-described structural component parts 11, 12 and 13. The second springing cover disk 14 comprises a fastening portion 16 near the center and an adjoining spring portion 17 near the periphery, which are connected to one another by at least one connection portion 26. The fastening portion 16 axially contacts the radially inner spacer ring 13 and can be connected to the radially inner spacer ring 13 by positive engagement or bonding. The spring portion 17 of the second springing cover disk 14 projects into the annular space 5.

Figure 2:
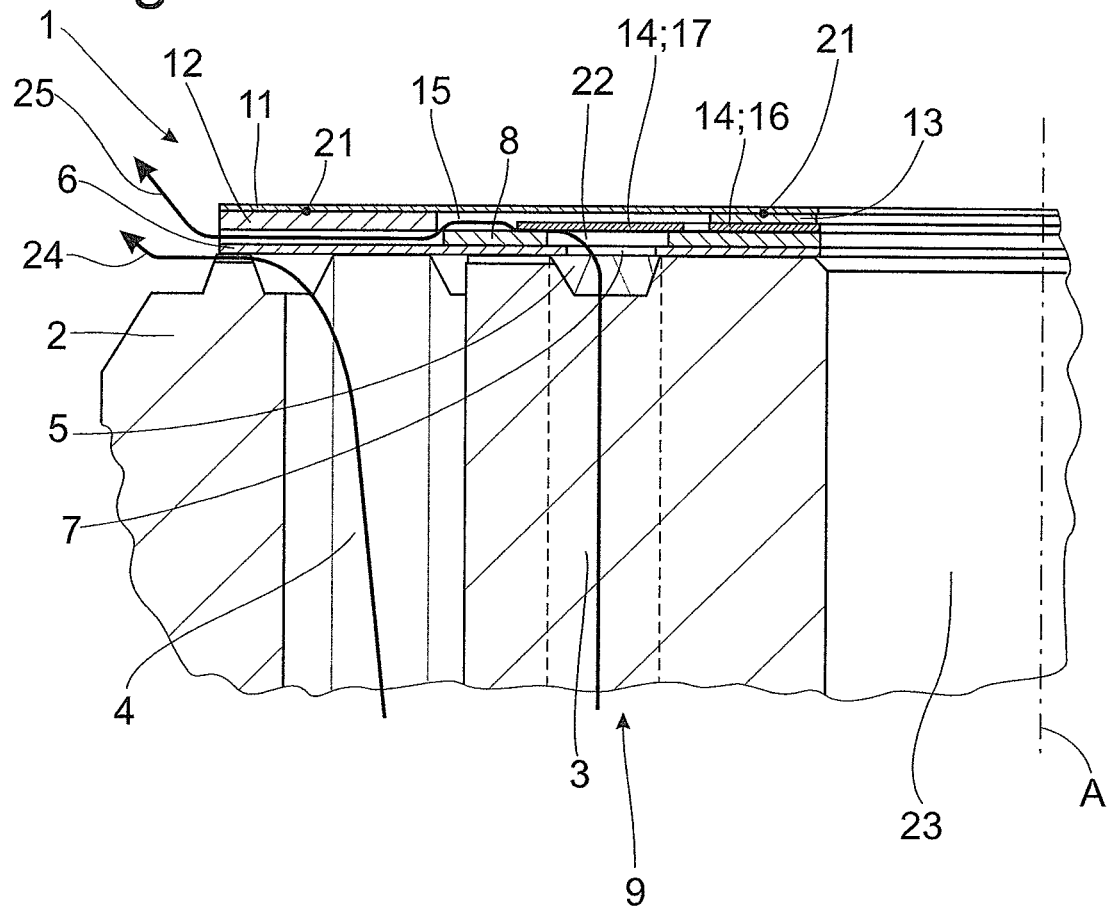
FIG. 2 is a partial sectional view of an exemplary constructional variant of the damping valve.

As is shown in FIG. 2, spring portion 17 at least indirectly and at least partially covers the pre-orifice 7 of valve disk 6. Depending on the flow direction of the damping medium, the spring portion 17 lifts axially and allows a defined second volume flow. In the opposite flow direction of the damping medium, the pre-orifice 7 of valve disk 6 is closed again by the spring portion 17 of the second springing cover disk 14 and the second volume flow is interrupted.

FIG. 3 further shows that the individual structural component parts can be constructed such that the axial thickness 18 of the radially outer spacer ring 12 is equal to or greater than a sum of the axial thicknesses 19, 20 of the radially inner spacer ring 13 and second springing cover disk 14. According to the invention, "axial thickness" means the axial extension or thickness of the structural component parts.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve, comprising:
   an inlet opening;
   an outlet opening
   a valve body having at least one through-flow channel for each flow direction of a damping medium through the valve body, wherein each through-flow channel connects the inlet opening to the outlet opening;
   at least one valve disk configured to cover the at least one through-flow channel for each flow direction at the outlet opening, wherein the at least one valve disk is configured for a first volume flow of the damping medium through the valve body;
   at least one pre-orifice formed in the at least one valve disk;
   at least one pre-orifice throttle arrangement arranged at least indirectly adjoining the at least one valve disk and configured to at least partially cover or open the at least one pre-orifice depending on the flow direction of a damping medium, and comprises:
   a plurality of structural component parts arranged coaxial to one another, wherein at least two of the plurality of structural component parts are inseparably connected to one another,
   wherein the pre-orifice throttle arrangement comprises:
      a radially outer spacer ring;
      a radially inner spacer ring;
      a first springing cover disk inseparably connected to the radially outer spacer ring by a bonding engagement and/or positive engagement; and
      a second springing cover disk.

2. The damping valve according to claim 1, wherein the first springing cover disk and the radially outer spacer ring are welded together.

3. Damping valve according to claim 1,
   wherein the pre-orifice throttle arrangement is formed such that an annular space, which is axially limited on one side by the first springing cover disk, is arranged between the radially inner spacer ring and the radially outer spacer ring,
   wherein the first springing cover disk at least partially extends radially over the radially inner spacer ring and the radially outer spacer ring.

4. The damping valve according to claim 1,
   wherein the second springing cover disk has a fastening portion proximate its center and an adjoining spring portion proximate its periphery,
   wherein the second springing cover disk is arranged in the pre-orifice throttle arrangement such that the fastening portion axially contacts the radially inner spacer ring and the adjoining spring portion projects into an annular space.

5. The damping valve according to claim 1, wherein an axial thickness of the radially outer spacer ring is equal to or greater than a sum of an axial thicknesses of the radially inner spacer ring and second springing cover disk.

6. A Damping valve, comprising:
   an inlet opening;
   an outlet opening a valve body having at least one through-flow channel for each flow direction of a damping medium through the valve body, wherein each through-flow channel connects the inlet opening to the outlet opening;

at least one valve disk configured to cover the at least one through-flow channel for each flow direction at the outlet opening, wherein the at least one valve disk is configured for a first volume flow of the damping medium through the valve body;

at least one pre-orifice formed in the at least one valve disk;

at least one pre-orifice throttle arrangement arranged at least indirectly adjoining the at least one valve disk and configured to at least partially cover or open the at least one pre-orifice depending on the flow direction of a damping medium, and comprises:

a plurality of structural component parts arranged coaxial to one another, wherein at least two of the plurality of structural component parts are inseparably connected to one another, wherein the pre-orifice throttle arrangement comprises:
    a radially outer spacer ring;
    a radially inner spacer ring;
    a first springing cover disk inseparably connected to the radially inner spacer ring by a bonding engagement and/or positive engagement; and
    a second springing cover disk.

7. The damping valve according to claim 6, wherein the first springing cover disk and the radially inner spacer ring are welded together.

8. Damping valve according to claim 6,
wherein the pre-orifice throttle arrangement is formed such that an annular space, which is axially limited on one side by the first springing cover disk, is arranged between the radially inner spacer ring and the radially outer spacer ring,
wherein the first springing cover disk at least partially extends radially over the radially inner spacer ring and the radially outer spacer ring.

9. The damping valve according to claim 6,
wherein the second springing cover disk has a fastening portion proximate its center and an adjoining spring portion proximate its periphery, wherein the second springing cover disk is arranged in the pre-orifice throttle arrangement such that the fastening portion axially contacts the radially inner spacer ring and the adjoining spring portion projects into an annular space.

10. The damping valve according to claim 6, wherein an axial thickness of the radially outer spacer ring is equal to or greater than a sum of an axial thicknesses of the radially inner spacer ring and second springing cover disk.

11. A vibration damper comprising:
a damping valve, comprising:
    an inlet opening;
    an outlet opening
    a valve body having at least one through-flow channel for each flow direction of a damping medium through the valve body, wherein each through-flow channel connects the inlet opening to the outlet opening;
    at least one valve disk configured to cover the at least one through-flow channel for each flow direction at the outlet opening, wherein the at least one valve disk is configured for a first volume flow of the damping medium through the valve body;
    at least one pre-orifice formed in the at least one valve disk;
    at least one pre-orifice throttle arrangement arranged at least indirectly adjoining the at least one valve disk and configured to at least partially cover or open the at least one pre-orifice depending on the flow direction of a damping medium, and comprises:
    a plurality of structural component parts arranged coaxial to one another, wherein at least two of the plurality of structural component parts are inseparably connected to one another,
    wherein the pre-orifice throttle arrangement comprises:
        a radially outer spacer ring;
        a radially inner spacer ring;
        a second springing cover disk; and
        a first springing cover disk inseparably connected to one of the radially outer spacer ring and the radially inner spacer ring by a bonding engagement and/or positive engagement.

\* \* \* \* \*